United States Patent
Inoue et al.

(10) Patent No.: US 8,818,677 B2
(45) Date of Patent: Aug. 26, 2014

(54) SYSTEM AND METHOD OF VEHICLE SPEED CONTROL HAVING VEHICLE SPEED LIMIT CONTROL AND SPEED INCREASE RATE CONTROL

(75) Inventors: Gen Inoue, Susono (JP); Hiroshi Omine, Susono (JP); Yasuhito Ishida, Toyokawa (JP)

(73) Assignees: Toyota Jidosha Kabushiki Kaisha, Toyota (JP); Advics Co., Ltd., Kariya (JP)

( * ) Notice: Subject to any disclaimer, the term of this patent is extended or adjusted under 35 U.S.C. 154(b) by 1276 days.

(21) Appl. No.: 12/450,580

(22) PCT Filed: Apr. 23, 2008

(86) PCT No.: PCT/IB2008/000998
§ 371 (c)(1),
(2), (4) Date: Oct. 1, 2009

(87) PCT Pub. No.: WO2008/132577
PCT Pub. Date: Nov. 6, 2008

(65) Prior Publication Data
US 2010/0100295 A1     Apr. 22, 2010

(30) Foreign Application Priority Data
Apr. 27, 2007  (JP) .................................. 2007-119576

(51) Int. Cl.
*B60T 8/32*  (2006.01)

(52) U.S. Cl.
USPC .......................................... 701/93

(58) Field of Classification Search
USPC ........................ 701/70, 93, 94, 72, 91, 96, 99
See application file for complete search history.

(56) References Cited

U.S. PATENT DOCUMENTS 4,124,088 A * 11/1978 Kuriyama et al. ............. 180/179
4,650,020 A *  3/1987 Mizuno et al. ................ 180/176
(Continued)

FOREIGN PATENT DOCUMENTS

DE    102 41 059 A1    3/2004
DE    699 15 917 T2    2/2005
(Continued)

OTHER PUBLICATIONS

Oct. 26, 2011 Office Action issued in Japan Patent Application No. 2007-119576 (with partial translation).

*Primary Examiner* — Thomas Black
*Assistant Examiner* — Sze-Hon Kong
(74) *Attorney, Agent, or Firm* — Oliff PLC

(57) ABSTRACT

If a condition for finishing speed limit control is satisfied, a gradient of a slope of the road is estimated based on a steady component of the longitudinal acceleration of the vehicle, and a correction factor is computed based on the slope gradient of the road, while a target acceleration of the vehicle is computed based on the vehicle speed. Then, a target vehicle speed is computed by adding the target vehicle speed of the last cycle to the product of the correction factor, target acceleration and the cycle time of the control, and the braking or driving force of each wheel is controlled so that the vehicle speed becomes equal to the target vehicle speed. In this manner, a passenger of the vehicle is prevented from feeling uncomfortable about the speed increase after the completion of the vehicle speed limit control.

16 Claims, 6 Drawing Sheets

(56) References Cited

U.S. PATENT DOCUMENTS

| | | | |
|---|---|---|---|
| 4,785,903 A * | 11/1988 | Leiber et al. | 180/197 |
| 5,003,483 A * | 3/1991 | Hedstrom | 701/93 |
| 5,019,986 A * | 5/1991 | Londt et al. | 701/94 |
| 5,177,682 A * | 1/1993 | Oo et al. | 701/93 |
| 5,287,773 A * | 2/1994 | Nakawaki et al. | 477/92 |
| 5,428,541 A * | 6/1995 | Miyata et al. | 701/85 |
| 5,434,786 A * | 7/1995 | Sakonjyu et al. | 701/95 |
| 5,495,251 A * | 2/1996 | Gilling et al. | 342/70 |
| 5,638,277 A | 6/1997 | Nagai | 701/70 |
| 5,646,850 A * | 7/1997 | Ishida et al. | 701/93 |
| 5,902,345 A * | 5/1999 | Minowa et al. | 701/96 |
| 6,006,144 A | 12/1999 | Takahashi et al. | |
| 6,006,848 A * | 12/1999 | Boehringer et al. | 180/178 |
| 6,009,367 A * | 12/1999 | Hori et al. | 701/93 |
| 6,185,499 B1 * | 2/2001 | Kinoshita et al. | 701/96 |
| 6,188,316 B1 | 2/2001 | Matsuno et al. | |
| 6,243,640 B1 * | 6/2001 | Beever | 701/70 |
| 6,253,141 B1 * | 6/2001 | McCann | 701/71 |
| 6,266,604 B1 * | 7/2001 | Linden | 701/93 |
| 6,283,240 B1 * | 9/2001 | Beever | 180/178 |
| 6,330,506 B1 * | 12/2001 | Roulet | 701/93 |
| 6,339,740 B1 * | 1/2002 | Seto et al. | 701/96 |
| RE37,598 E * | 3/2002 | Toukura et al. | 477/40 |
| 6,401,024 B1 * | 6/2002 | Tange et al. | 701/96 |
| 6,411,883 B1 * | 6/2002 | Basten | 701/93 |
| 6,470,256 B1 * | 10/2002 | Cikalo et al. | 701/93 |
| 6,580,996 B1 * | 6/2003 | Friedrich | 701/96 |
| RE38,241 E * | 8/2003 | Toukura | 477/46 |
| 6,671,607 B2 * | 12/2003 | Ishizu et al. | 701/93 |
| 6,678,603 B2 * | 1/2004 | Egawa et al. | 701/96 |
| 6,945,346 B2 * | 9/2005 | Massen | 180/170 |
| 7,016,803 B2 * | 3/2006 | Kitazawa | 702/142 |
| 7,050,898 B2 * | 5/2006 | Ono et al. | 701/70 |
| 7,134,985 B2 * | 11/2006 | Watanabe et al. | 477/186 |
| 7,184,873 B1 * | 2/2007 | Idsinga et al. | 701/93 |
| 7,184,874 B2 * | 2/2007 | Michi et al. | 701/96 |
| 7,280,903 B2 * | 10/2007 | Arai et al. | 701/96 |
| 7,308,961 B2 * | 12/2007 | Satou et al. | 180/170 |
| 7,319,927 B1 * | 1/2008 | Sun et al. | 701/93 |
| 7,433,772 B2 * | 10/2008 | Isaji et al. | 701/71 |
| 7,525,475 B2 * | 4/2009 | Kamping et al. | 342/71 |
| 7,561,954 B2 * | 7/2009 | Aizawa et al. | 701/79 |
| 7,587,267 B2 * | 9/2009 | Mori et al. | 701/93 |
| 7,660,659 B2 * | 2/2010 | Watanabe et al. | 701/96 |
| 7,739,022 B2 * | 6/2010 | Kobayashi et al. | 701/70 |
| 7,801,658 B2 * | 9/2010 | Ohshima | 701/93 |
| 7,925,413 B2 * | 4/2011 | Isaji et al. | 701/93 |
| RE42,464 E * | 6/2011 | Nada | 701/30.6 |
| 8,005,602 B2 * | 8/2011 | Bando et al. | 701/93 |
| 8,103,394 B2 * | 1/2012 | Hashimoto | 701/22 |
| 8,165,747 B2 * | 4/2012 | Ueno et al. | 701/36 |
| 8,370,042 B2 * | 2/2013 | Tokimasa et al. | 701/94 |
| 8,380,408 B2 * | 2/2013 | Hyodo et al. | 701/64 |
| 8,380,419 B2 * | 2/2013 | Sauter | 701/93 |
| 2003/0074124 A1 * | 4/2003 | Ono et al. | 701/70 |
| 2003/0088355 A1 * | 5/2003 | Fuhrer et al. | 701/93 |
| 2004/0044460 A1 * | 3/2004 | Kikuchi | 701/93 |
| 2004/0049333 A1 | 3/2004 | Kustosch et al. | |
| 2005/0143895 A1 * | 6/2005 | Kato | 701/96 |
| 2006/0095190 A1 * | 5/2006 | Currie | 701/79 |
| 2006/0212205 A1 * | 9/2006 | Yang et al. | 701/70 |

FOREIGN PATENT DOCUMENTS

| | | |
|---|---|---|
| DE | 600 22 821 T2 | 7/2006 |
| JP | A-60-50034 | 3/1985 |
| JP | A-11-20498 | 1/1999 |
| JP | A-2001-301589 | 10/2001 |
| JP | A-2003-94983 | 4/2003 |
| JP | A-2003-205762 | 7/2003 |
| JP | A-2004-90679 | 3/2004 |
| JP | A-2005-1632 | 1/2005 |
| JP | A-2005-127424 | 5/2005 |
| JP | A-2006-307798 | 11/2006 |

* cited by examiner

SYSTEM AND METHOD OF VEHICLE SPEED CONTROL HAVING VEHICLE SPEED LIMIT CONTROL AND SPEED INCREASE RATE CONTROL

The disclosure of Japanese Patent Application No. 2007-119576 filed on Apr. 27, 2007, including the specification, drawings and abstract is incorporated herein by reference in its entirety.

BACKGROUND OF THE INVENTION

1. Field of the Invention

The invention relates to vehicle speed control system and vehicle speed control method of a vehicle, such as an automobile, and more particularly to a vehicle speed control system that performs vehicle speed limit control and speed increase rate control and a vehicle speed control method.

2. Description of the Related Art

As one type of vehicle speed control system of a vehicle, such as an automobile, a vehicle speed control system is known which performs vehicle speed limit control for limiting the vehicle speed to the upper-limit vehicle speed or lower, for example, when an off-road vehicle descends a hill, and performs speed increase rate control for controlling the rate of increase of the vehicle speed to a target rate of speed increase when the vehicle speed limit control is finished.

For example, Japanese Patent Application Publication No. 2005-1632 (JP-A-2005-1632) discloses a vehicle speed control system that is arranged to perform constant low-speed running control under which the vehicle speed is limited to the upper-limit vehicle speed or lower, by inhibiting one or more gear position(s) of a transmission from being established, and cancel the inhibition of the gear positions from the lower-speed gear position one by one after the completion of the constant low-speed running control, thereby to prevent a rapid increase in the vehicle speed.

With the vehicle speed control system as described in the above-identified publication, the vehicle speed can be surely prevented from rapidly increasing after the constant low-speed running control is finished. However, the inhibition of the gear positions is cancelled according to a pattern that is determined based on the gear position of the transmission and the elapsed time at the time when the constant low-speed running control is finished, and the rate of increase of the vehicle speed is specified or determined by the cancellation of the inhibition of the gear positions. Therefore, a passenger or passengers of the vehicle may feel a sense of disagreement or feel uncomfortable about the speed increase, depending upon running conditions of the vehicle at the time when the constant low-speed running control is finished.

For example, even if the vehicle speed increases at the same rate after the constant low-speed running control is finished, the passenger of the vehicle may feel that the vehicle speed increases at a relatively high rate when the vehicle speed detected at the time of the completion of the constant low-speed running control is low, and may feel that the vehicle speed increases at a relatively low rate when the vehicle speed detected at the time of the completion of the constant low-speed running control is high. Also, the passenger of the vehicle may feel that the vehicle speed increases at a higher rate as the degree of inclination or gradient of a road on which the vehicle runs is larger during downhill running of the vehicle.

SUMMARY OF THE INVENTION

The invention has been developed in view of the above-described problems encountered in the known vehicle speed control system and vehicle speed control method which increase the vehicle speed while preventing a rapid increase in the vehicle speed after the constant low-speed running control is finished. It is a main object of the invention to prevent a passenger of a vehicle from feeling a sense of disagreement about speed increase when the vehicle speed increases after the completion of vehicle speed limit control, by varying the degree or rate of increase of the vehicle speed depending on running conditions of the vehicle when the vehicle speed increases after the completion of the vehicle speed limit control.

According to a first aspect of the invention, a vehicle speed control system of a vehicle is provided which has a vehicle speed detector and a controller. The controller performs vehicle speed limit control that limits a vehicle speed so that the vehicle speed detected by the vehicle speed detector does not exceed a speed limit, and speed increase rate control that allows increase of the speed of the vehicle after the vehicle speed limit control is finished while limiting a rate of increase of the speed of the vehicle so that the rate of increase of the vehicle speed does not exceed a target rate of increase of the vehicle speed. The controller sets the target rate of increase of the vehicle speed based on the vehicle speed detected by the vehicle speed detector, so that the target rate of increase of the vehicle speed becomes a larger value when the vehicle speed is high, than that obtained when the vehicle speed is low.

According to a second aspect of the invention, a vehicle speed control method of a vehicle is provided which includes the steps of detecting a vehicle speed, limiting the vehicle speed so that the vehicle speed does not exceed a speed limit, and allowing increase of the speed of the vehicle after the vehicle speed limit control is finished while limiting a rate of increase of the speed of the vehicle so that the rate of increase of the vehicle speed does not exceed a target rate of increase of the vehicle speed, wherein the target rate of increase of the vehicle speed is set based on the detected vehicle speed, such that the target rate of increase of the vehicle speed becomes a larger value when the vehicle speed is than that obtained when the vehicle speed is low.

In the vehicle speed control system and vehicle speed control method as described above, once the vehicle speed limit control is finished, the target rate of increase of the vehicle speed is set based on the vehicle speed detected by the vehicle speed detector, such that the target rate of speed increase becomes a larger value when the vehicle speed is high, than that obtained when the vehicle speed is low, and the speed increase rate control is performed based on the target speed increase rate. Since the speed increase rate of the vehicle after the completion of the vehicle speed limit control is controlled to be variable depending on the vehicle speed, the passenger of the vehicle is prevented from feeling that the rate of speed increase is too large when the vehicle speed is low, and is also prevented from feeling that the rate of speed increase is too small when the vehicle speed is high. Thus, the sense of disagreement felt by the passenger of the vehicle when the vehicle speed increases after the vehicle speed limit control is finished can be surely reduced, as compared with the case where the rate of speed increase is constant irrespective of the vehicle speed.

In the vehicle speed control system of the vehicle, the vehicle speed limit control may be control that controls braking and driving force of the vehicle so that the vehicle speed becomes equal to or lower than the speed limit, irrespective of a gradient of a road surface, and the speed increase rate control may be control that controls braking and driving force of the vehicle so that the rate of increase of the speed of the vehicle becomes equal to the target rate of increase of the vehicle speed.

According to the vehicle speed control system as described above, the vehicle speed limit control is performed so as to control braking and driving force of the vehicle so that the vehicle speed becomes equal to or lower than the speed limit, irrespective of the gradient of the road surface, and the speed increase rate control is performed so as to control braking and driving force of the vehicle so that the rate of increase of the vehicle speed becomes equal to the target rate of increase of the vehicle speed. When the vehicle speed limit control is finished, therefore, the rate of increase of the vehicle speed after the completion of the vehicle speed limit control can be surely controlled to the target rate of speed increase through the speed increase control. Thus, the rate of speed increase can be controlled to be variable depending on the vehicle speed, such that the rate of increase of the vehicle speed becomes larger when the vehicle speed is high, than that obtained when the vehicle speed is low.

In the vehicle speed control system as described above, the vehicle speed limit control may be control that controls at least the braking force of the vehicle so that the vehicle speed does not exceed the speed limit when the vehicle runs on a downhill, and the speed increase rate control comprises control that controls at least the braking force of the vehicle so that the rate of increase of the speed of the vehicle during downhill running of the vehicle does not exceed the target rate of increase of the vehicle speed.

According to the vehicle speed control system as described above, the vehicle speed limit control is performed so as to control at least the braking force of the vehicle so that the vehicle speed does not exceed the speed limit when the vehicle runs on a downhill, and the speed increase rate control is performed so as to control at least the braking force of the vehicle so that the rate of increase of the vehicle speed during downhill running does not exceed the target rate of increase of the vehicle speed. When the vehicle speed limit control is finished during downhill running, therefore, the rate of increase of the vehicle speed after the completion of the vehicle speed limit control can be surely controlled so as not to exceed the target rate of speed increase, and at the same time the rate of increase of the vehicle speed can be surely controlled to be variable depending on the vehicle speed, such that the rate of speed increase becomes larger when the vehicle speed is high, than that obtained when the vehicle speed is low.

In the vehicle speed control system as described above, the controller may obtain a gradient of a road on which the vehicle runs, and may set the target rate of increase of the vehicle speed based on the vehicle speed and the gradient of the road when the vehicle speed limit control is finished.

The vehicle speed control method as described above may further include the steps of obtaining a gradient of a road on which the vehicle runs, and setting the target rate of increase of the vehicle speed based on the vehicle speed and the gradient of the road when the vehicle speed limit control is finished.

According to the vehicle speed control system and vehicle speed control method as described above, the gradient of the road on which the vehicle runs is obtained, and the target rate of increase of the vehicle speed is set based on the vehicle speed and the gradient of the road when the vehicle speed limit control is finished. Thus, the rate of speed increase can be controlled to be variable depending on the vehicle speed, and can also be controlled to be variable depending on the gradient of the road.

In the vehicle speed control system as described above, the controller may set the target rate of increase of the vehicle speed to a smaller value when the gradient of a downhill of the road is large, than that obtained when the gradient of the downhill of the road is small.

In the vehicle speed control method as described above, the target rate of increase of the vehicle speed may be set to a smaller value when the gradient of a downhill of the road is large, than that obtained when the gradient of the downhill is small.

According to the vehicle speed control system and vehicle speed control method as described just above, the target rate of increase of the vehicle speed is set to a smaller value when the gradient of a downhill of the road is large, than that obtained when the gradient of the downhill of the road is small. Therefore, the passenger can be prevented from feeling that the rate of speed increase is too small when the gradient of the downhill is small, and can also be prevented from feeling that the rate of speed increase is too large when the gradient of the downhill is large.

In the vehicle speed control system as described above, the vehicle speed control system may compute a target vehicle speed based on a target vehicle speed of the last cycle and the target rate of increase of the vehicle speed at predetermined computation intervals, and may control the braking and driving force of the vehicle so that the vehicle speed becomes equal to the target vehicle speed.

According to the vehicle speed control system as described above, the target vehicle speed is computed at the predetermined computation intervals based on the target vehicle speed of the last cycle and the target rate of increase of the vehicle speed, and the braking and/or driving force of the vehicle is controlled so that the vehicle speed becomes equal to the target vehicle speed. It is thus possible to surely make the rate of increase of the vehicle speed equal to the target rate of speed increase by controlling the vehicle speed to the target vehicle speed through control of the braking and/or driving force of the vehicle.

In the vehicle speed control system as described above, the controller may finish the vehicle speed limit control in at least one of the case where an operation to finish the vehicle speed limit control is performed by a driver and the case where the vehicle speed control system does not operate normally, in a situation where the vehicle speed limit control is performed.

According to the vehicle speed control system as described above, when an operation to finish the vehicle speed limit control is performed by the driver, or it is determined the vehicle speed control system does not operate normally, the vehicle speed limit control is finished, and the speed increase control can be initiated with reliability so that the rate of increase of the vehicle speed becomes equal to the target rate of speed increase.

In the vehicle speed control system as described above, the vehicle speed control system may finish the speed increase rate control in at least one of the case where the braking forces of all wheels become substantially equal to 0, and the case where an accelerating or decelerating operation is performed by a driver, in a situation where the speed increase rate control is performed.

According to the vehicle speed control system as described above, the speed increase rate control is finished in at least one of the case where the braking forces of all of the wheels become substantially equal to zero, and the case where an accelerating or decelerating operation is performed by the driver, in a situation where the speed increase rate control is performed. Thus, the speed increase rate control can be finished with reliability when the vehicle speed cannot be increased during, for example, downhill running, due to reduction of the braking force of the wheels, or when the driver wishes to accelerate or decelerate the vehicle, rather than increase the speed through the speed increase rate control.

Also, in the vehicle speed control system as described above, the vehicle speed limit control may be control that controls at least the braking force of the vehicle so as to control the vehicle speed so that the vehicle speed becomes equal to or lower than the speed limit when the vehicle runs on a downhill, and the speed increase rate control may be control that controls at least the braking force of the vehicle so that the rate of increase of the speed of the vehicle during downhill running becomes equal to the target rate of increase of the vehicle speed.

Also, in the vehicle speed control system as described above, the controller may estimate the gradient of the road, based on a steady component of a longitudinal acceleration of the vehicle.

Also, in the vehicle speed control system as described above, the vehicle may include a vehicle speed limit switch adapted to be operated by the driver, and it may be determined that the operation to finish the vehicle speed limit control is performed by the driver when the driver switches the vehicle speed limit switch to an OFF state.

Also, in the vehicle speed control system as described above, the vehicle may include a vehicle speed limit switch adapted to be operated by a driver, and the vehicle speed limit control may be performed when the vehicle speed limit switch is in an ON state.

In the vehicle speed control system as described above, the vehicle may be a four-wheel drive vehicle including a vehicle speed limit switch adapted to be operated by a driver and a transfer gearbox, and the vehicle speed limit switch may be switched to an ON state through a driver's operation only when a shift position of the transfer gearbox is an L range.

BRIEF DESCRIPTION OF THE DRAWINGS

The features, advantages, and technical and industrial significance of this invention will be better understood by reading the following detailed description of preferred embodiments of the invention, when considered in connection with the accompanying drawings, in which.

DETAILED DESCRIPTION OF THE EMBODIMENTS

In the following description and the accompanying drawings, the present invention will be described in greater detail with reference to exemplary embodiments.

Figure 1:
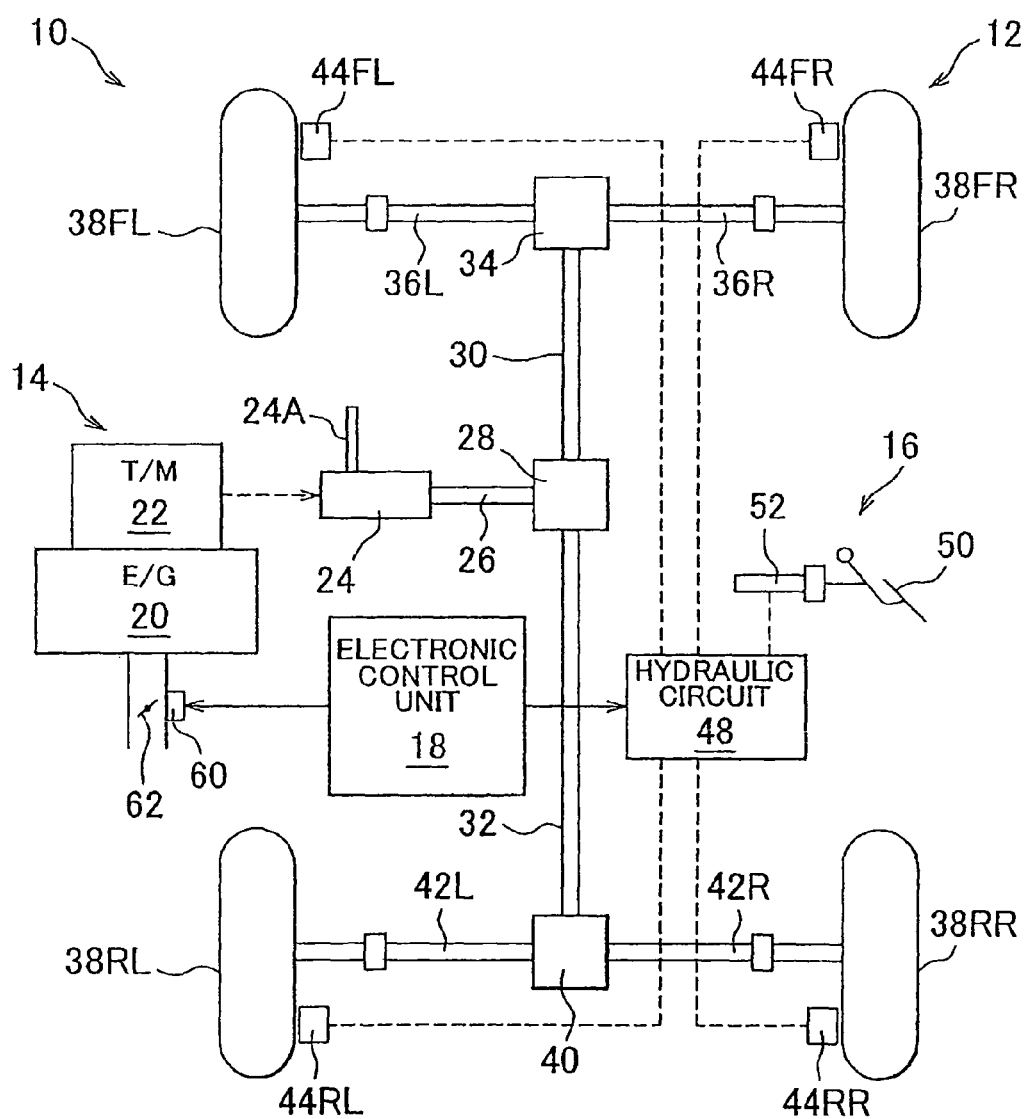
FIG. 1 is a schematic view showing the construction of a vehicle speed control system as one embodiment of the invention, which is employed in a four-wheel drive vehicle including a transfer gearbox.
Figure 2:
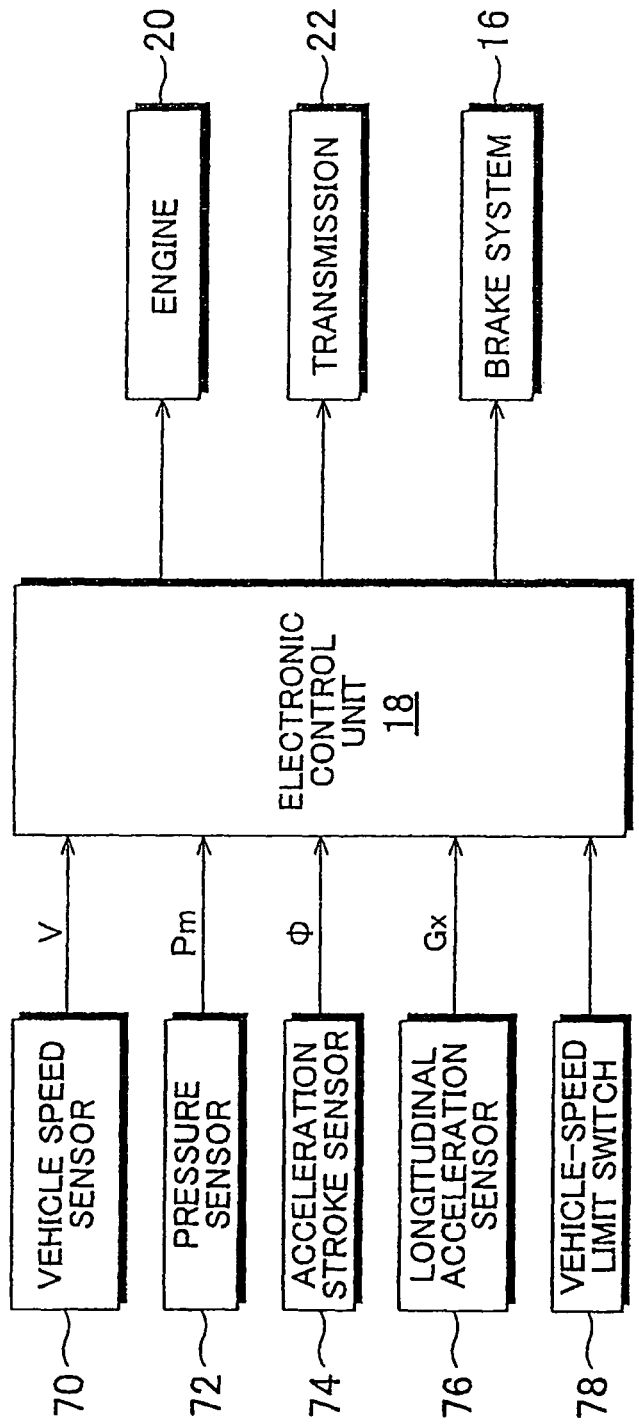
FIG. 2 is a block diagram illustrating an electronic control unit shown in FIG. 1.

FIG. 1 is a schematic view showing the construction of a vehicle speed control system as one embodiment of the invention, which is employed in a four-wheel drive vehicle including a transfer gearbox. FIG. 2 is a block diagram illustrating an electronic control unit shown in FIG. 1.

In FIG. 1, reference numeral 10 generally designates a vehicle speed control system of a vehicle 12, and the vehicle speed control system 10 has a drive train or power train 14 including an engine 20, a brake system 16, and an electronic control unit 18. In operation, the driving force of the engine 20 is transmitted to an output shaft 26 via a transmission 22 and a transfer gearbox 24, and the driving force of the output shaft 26 is transmitted to a front-wheel propeller shaft 30 and a rear-wheel propeller shaft 32 via a center differential 28.

The transfer gearbox 24 includes an auxiliary transmission having H range (high-speed transmission position) in which the driving torque of the engine 20 is transmitted to the center differential 28 at a high-speed gear ratio, and L range (low-speed transmission position) in which the driving torque is transmitted to the center differential 28 at a low-speed gear ratio. A control lever 24A is adapted to be operated by the driver so as to switch the shift position of the transfer gearbox 24 between the H range and the L range.

The driving force of the front-wheel propeller shaft 30 is transmitted to left-front-wheel drive shaft 36L and right-front-wheel drive shaft 36R via a front differential 34, so as to drive and rotate left front wheel 38FL and right front wheel 38FR. Similarly, the driving force of the rearwheel propeller shaft 32 is transmitted to left-rear-wheel drive shaft 42L and right-rear-wheel drive shaft 42R via a rear differential 40, so as to drive and rotate left rear wheel 38RL and right rear wheel 38RR. In the embodiment shown in FIG. 1, the center differential 28, front differential 34 and the rear differential 40 are not provided with locking devices.

The left and right front wheels 38FL, 38FR and left and right rear wheels 38RL, 38RR are respectively provided with wheel cylinders 44FL, 44FR, 44RL, 44RR for producing braking force of the corresponding wheels. The brake system 16 controls the braking force of each wheel by controlling the braking pressure of the corresponding wheel cylinder 44FL-44RR through a hydraulic circuit 48. Although not illustrated in detail in FIG. 1, the hydraulic circuit 48 includes a reservoir, an oil pump, various valve devices, and so forth, and the braking pressure of each wheel cylinder is normally controlled by a master cylinder 52 that is driven in accordance with the depression of the brake pedal 50 operated by the driver, but may be controlled by the electronic control unit 18 as needed as will be described in detail later.

As well known in the art, the power of the engine 20 is controlled by a throttle valve actuator 60 operable to change the opening of a throttle valve 62, and the opening of the throttle valve 62 is controlled in accordance with the amount by which an accelerator pedal (not shown in FIG. 1) is depressed by the driver.

Although not illustrated in detail in FIG. 1 and FIG. 2, the electronic control unit 18 includes a microcomputer for vehicle speed control, a microcomputer that controls the engine 20, a microcomputer that controls the transmission 22, and a microcomputer that controls the brake system 16. Each of the microcomputers has CPU, ROM, RAM and input/output port device(s), which are connected to each other by a bidirectional common bus.

As shown in FIG. 2, the electronic control unit 18 receives a signal indicative of the vehicle speed V from a vehicle speed sensor 70, a signal indicative of the master cylinder pressure Pm from a pressure sensor 72, a signal indicative of the accelerator pedal travel φ from an acceleration stroke sensor 74, a signal indicative of the longitudinal acceleration Gx of the vehicle (i.e., the acceleration Gx as measured in the longitudinal or running direction of the vehicle) from a longitudinal acceleration sensor 76, and a signal indicative of whether a vehicle-speed limit switch 78 operated by the driver is ON or OFF, in addition to information necessary for controlling the engine 20 and the transmission 22. The vehicle-speed limit switch 78 is in the OFF state during normal operation, and may be switched to the ON state through the driver's operation when the shift position of the transfer gearbox 24 is in the L range.

The electronic control unit 18 controls the engine 20, transmission 22, and brake system 16 in manners known in the relevant art when the vehicle-speed limit switch 78 is in the OFF state. When the vehicle-speed limit switch 78 is in the ON state, on the other hand, the electronic control unit 18 controls the driving force of the vehicle through control of the engine 20 and the transmission 22, and controls the braking force of the vehicle through control of the brake system 16, so as to restrict the vehicle speed such that the vehicle speed V detected by the vehicle speed sensor 70 does not exceed the upper-limit vehicle speed Vulim. Under the vehicle-speed limit control of the illustrated embodiment, in particular, the vehicle speed V is limited to the upper-limit vehicle speed Vulim or lower during downhill running of the vehicle. It is, however, to be noted that the vehicle-speed limit control itself does not provide the substance of the invention, and therefore may be carried out in any manner known in the relevant art.

In a situation where the vehicle-speed limit control is performed, if the vehicle-speed limit switch 78 is switched to the OFF state by the driver or if it is determined, upon detection of an abnormality, that the vehicle speed control system 10 does not operate normally, the electronic control unit 18 determines that a condition for finishing the vehicle-speed limit control is satisfied, and finishes the vehicle-speed limit control.

After finishing the vehicle-speed limit control, the electronic control unit 18 computes a target acceleration Gxat (which may also be called "target rate of speed increase") of the vehicle based on the vehicle speed V, and estimates the gradient or inclination Gslope of a slope of the road on which the vehicle is running, based on the longitudinal acceleration (which may also be called "rate of speed increase") of the vehicle. The electronic control unit 18 also computes a correction factor Kg based on the gradient Gslope of the slope (which may also be called "downhill gradient" when the vehicle runs on a downhill and called "uphill gradient" when the vehicle runs on an uphill) of the road. The electronic control unit 18 then computes a target vehicle speed Vat to which the vehicle speed is increased, based on the vehicle speed V, the target acceleration Gxat of the vehicle and the correction factor Kg, and performs control for increasing the vehicle speed by reducing the braking force produced by the brake system 16 so that the vehicle speed V becomes equal to the target vehicle speed Vat.

Then, the electronic control unit 18 determines, during the speed increase control, whether a condition for finishing the speed increase control is satisfied, and finishes the speed increase control when the condition for finishing the speed increase control is satisfied. In this case, it may be determined that the condition for finishing the speed increase control is satisfied when the braking forces of all of the wheels become equal to 0, or an accelerating or decelerating operation is performed by the driver.

Figure 3:
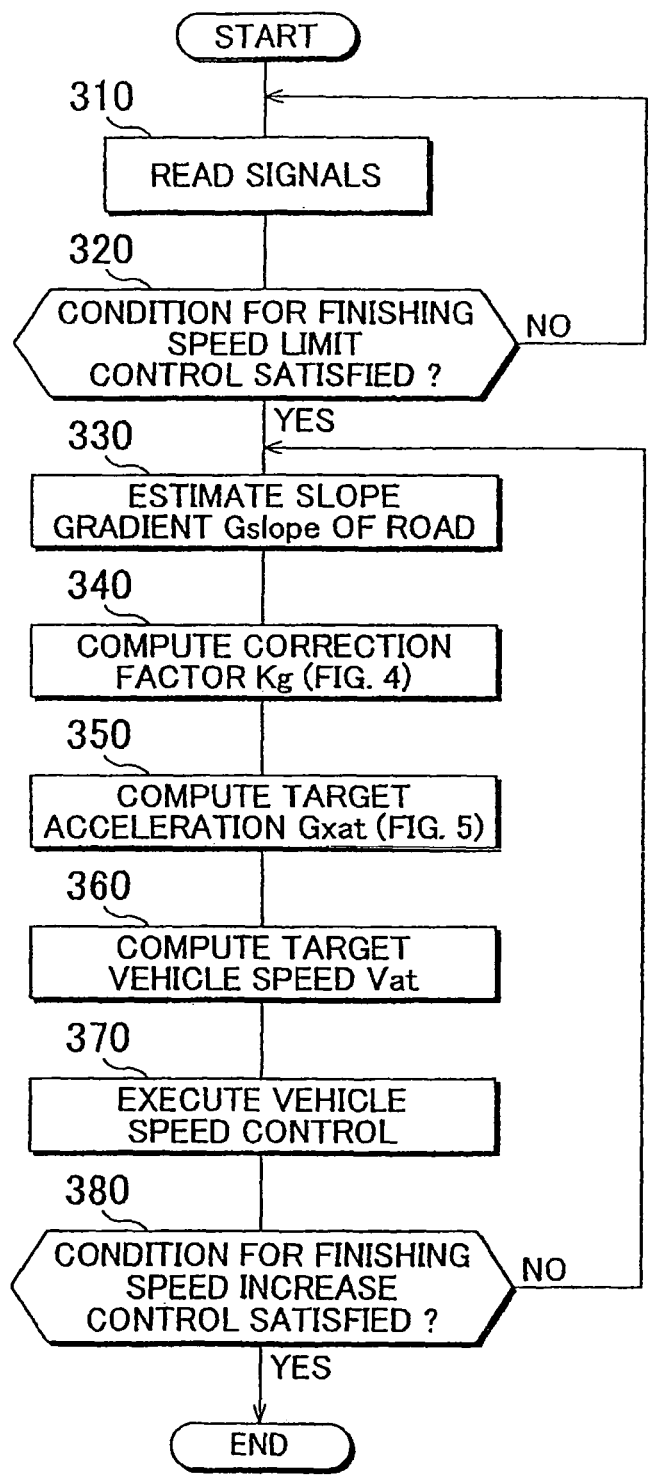
FIG. 3 is a flowchart illustrating a speed increase control routine according to the above-indicated one embodiment of the invention.

Referring next to the flowchart shown in FIG. 3, a speed increase control routine according to this embodiment will be explained. The control illustrated in the flowchart of FIG. 3 is initiated at the same time that speed limit control starts, and is repeatedly carried out at given time intervals.

Initially, step 310 is executed to read signals, such as a signal indicative of the vehicle speed V detected by the vehicle speed sensor 70, and step 320 is executed to determine whether any condition for finishing speed limit control is satisfied by determining whether either of the following conditions A1 and A2 is satisfied. The control returns to step 310 if a negative decision (NO) is made in step 320, and goes to step 330 if an affirmative decision (YES) is made in step 320. The condition A1 is that the vehicle-speed limit switch 78 is switched to the OFF state by the driver, and the condition A2 is that it is determined, upon detection of an abnormality, that the vehicle speed control system 10 does not operate normally.

In step 330, the longitudinal acceleration Gx of the vehicle is subjected to a process using a low-pass filter, for example, so that a steady component of the longitudinal acceleration Gx is extracted, and the slope gradient Gslope of the road on which the vehicle is running is estimated based on the steady component of the longitudinal acceleration Gx. Thus, in this embodiment, the longitudinal acceleration sensor 76 functions as a part of means for obtaining the gradient of the road.

Figure 4:
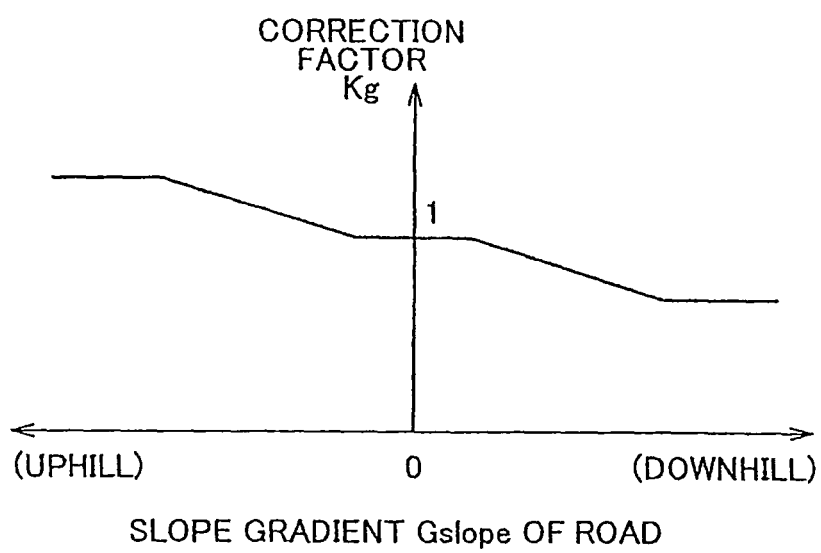
FIG. 4 is a graph indicating the relationship between the gradient Gslope of a slope or hill and the correction factor Kg.

In step 340, the correction factor Kg (positive value) is computed from a map corresponding to the graph shown in FIG. 4, based on the slope gradient Gslope of the road on which the vehicle is running. In this case, where the road on which the vehicle runs is a downhill, the correction factor Kg becomes smaller within a range equal to or smaller than 1 as the magnitude of the slope gradient Gslope increases, as shown in FIG. 4. Where the road on which the vehicle runs is an uphill, on the other hand, the correction factor Kg becomes larger within a range equal to or larger than 1 as the magnitude of the slope gradient Gslope increases.

Figure 5:
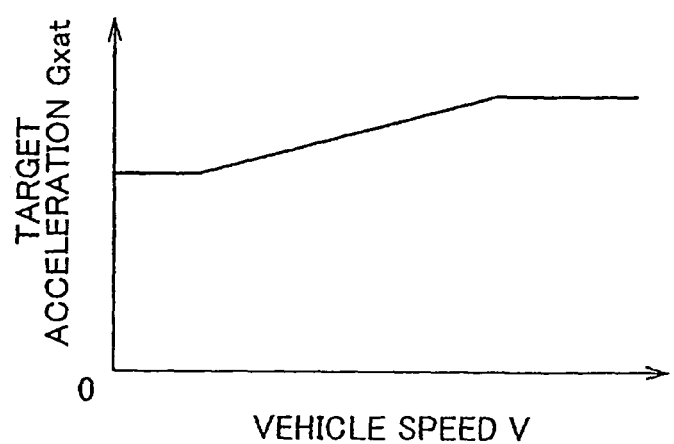
FIG. 5 is a graph indicating the relationship between the vehicle speed V and the target acceleration Gxat of the vehicle.

In step 350, the target acceleration Gxat (positive value) of the vehicle is computed from a map corresponding to the graph shown in FIG. 5, based on the vehicle speed V. In this case, the target acceleration Gxat becomes a larger value as the vehicle speed V is higher, as shown in FIG. 5.

In step 360, the target vehicle speed Vat is computed according to the following equation (1), where Vat(n−1) represents the target vehicle speed Vat of the last cycle, and Tc is the cycle time of the control according to the flowchart shown in FIG. 3. When the target vehicle speed Vat is computed immediately after an affirmative decision (YES) is made in step 320, Vat(n−1) is set to the vehicle speed V detected by the vehicle speed sensor 70 in the last cycle.

$$Vat = Vat(n-1) + Kg \times Gxat \times Tc \qquad (1)$$

In step 370, a target braking or driving force of each vehicle is computed based on a difference ΔV between the current vehicle speed V and the target vehicle speed Vat, so that the difference ΔV becomes equal to 0, and the braking or driving force of each wheel is controlled so as to be equal to the corresponding target braking or driving force, so that the vehicle speed V is controlled to be equal to the target vehicle speed Vat.

Step 380 is then executed to determine whether any condition for finishing the above-described speed increase control is satisfied, by determining whether either of the following conditions B1 and B2 is satisfied. If a negative decision (NO) is made in step 380, the control returns to step 330. If an affirmative decision (YES) is made in step 380, the control according to the flowchart shown in FIG. 3 is finished. The above-mentioned condition B1 is that the braking forces of all of the wheels are substantially equal to 0, and the condition B2 is that an accelerating or decelerating operation is performed by the driver.

In the embodiment shown in FIG. 1-FIG. 5, if a condition for finishing the speed limit control is satisfied, an affirmative decision (YES) is made in step 320, and the slope gradient Gslope of the road on which the vehicle runs is estimated based on a steady component of the longitudinal acceleration Gx in step 330. Then, the correction factor Kg is computed based on the slope gradient Gslope of the road in step 340, and the target acceleration Gxat of the vehicle is computed based on the vehicle speed V in step 350. Then, in step 360, the target vehicle speed Vat is computed by adding the target vehicle speed Vat(n−1) of the last cycle to the product of the correction factor Kg, target acceleration Gxat, and the cycle time Tc of the control according to the flowchart shown in FIG. 3. Then, the braking or driving force of each wheel is controlled so that the vehicle speed V becomes equal to the target vehicle speed Vat in step 370.

Thus, in the illustrated embodiment, the rate of increase of the vehicle speed after the completion of the vehicle speed limit control can be controlled to be variable depending on the vehicle speed. It is thus possible to surely reduce a sense of disagreement felt by the driver when the vehicle speed increases after the vehicle speed limit control is finished, as compared with the case where the rate of increase of the vehicle speed is constant irrespective of the vehicle speed.

Figure 6:
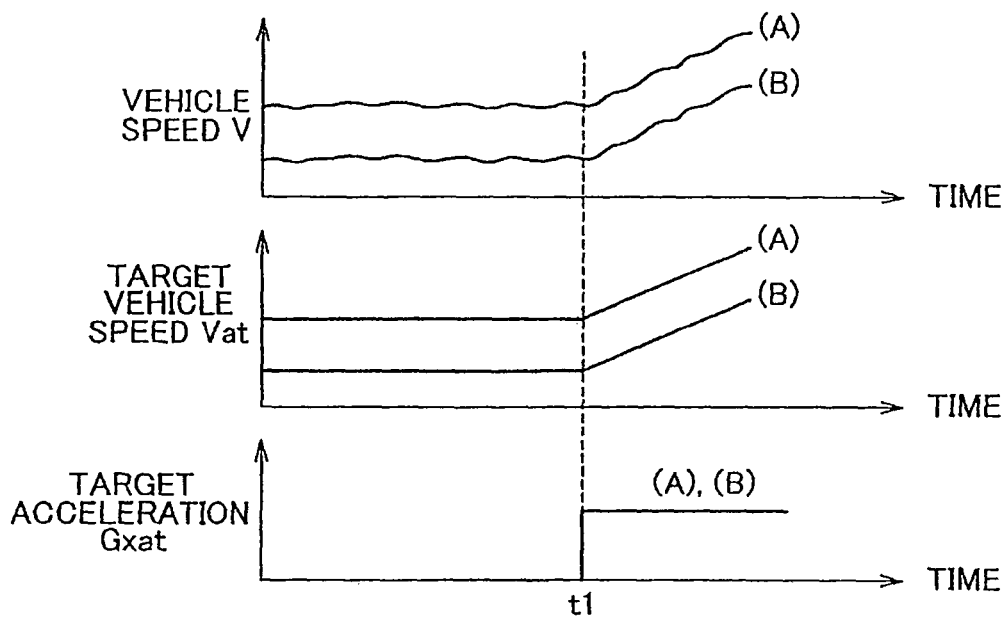
FIG. 6 is a graph illustrating vehicle speed limit control and speed increase control performed by a known vehicle speed control system, with respect to the case (A) where the vehicle speed is high, and the case (B) where the vehicle speed is low.
Figure 7:
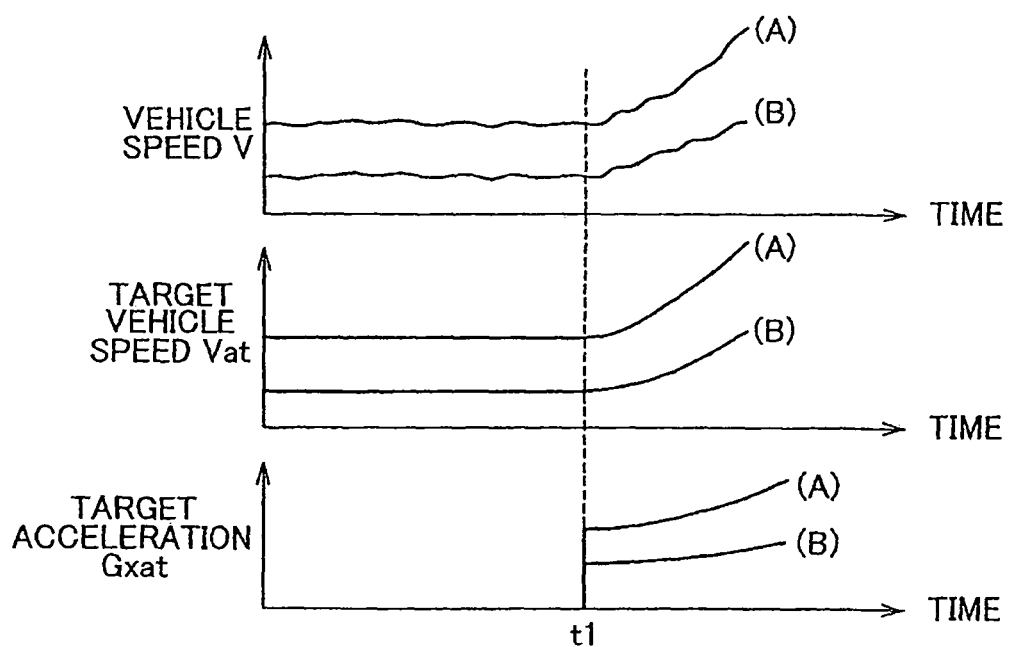
FIG. 7 is a graph illustrating vehicle speed limit control and speed increase control performed by the vehicle speed control system of this embodiment, with respect to the case (A) where the vehicle speed is high, and the case (B) where the vehicle speed is low.

For example, FIG. 6 is a graph showing vehicle speed limit control and speed increase control performed by a conventional vehicle speed control system with which the rate of increase of the vehicle speed after the completion of the vehicle speed limit control is constant irrespective of the vehicle speed V, with respect to the case (A) where the vehicle runs at a high speed, and the case (B) where the vehicle runs at a low speed. As shown in FIG. 6, in the case where the rate of increase of the vehicle speed after the completion (time t1) of the vehicle speed limit control is constant irrespective of the vehicle speed V, and the rate of increase of the vehicle speed is set to a high value, the passenger of the vehicle may feel a sense of disagreement or feel uncomfortable due to the excessively high rate of increase of the vehicle speed after the completion of the vehicle speed limit control where the vehicle runs at a low speed. If the rate of increase of the vehicle speed is set to a low value, the passenger of the vehicle may feel a sense of disagreement or feel uncomfortable due to the excessively low rate of increase of the vehicle speed after the completion of the vehicle speed limit control In the illustrated embodiment, on the other hand, the rate of increase of the vehicle speed after the completion of the vehicle speed limit control is made larger in the case (A) where the vehicle speed measured at time t1 at which the vehicle speed limit control is finished is high, than that in the case (B) where the vehicle speed measured at time t1 is low, as shown in FIG. 7. Conversely, the rate of increase of the vehicle speed after the completion of the vehicle speed limit control is made smaller in the case (B) of low vehicle speed, than that in the case (A) of high vehicle speed. Accordingly, the rate of increase of the vehicle speed can be optimally set to be variable depending on the vehicle speed, and the passenger of the vehicle can be surely prevented from feeling a sense of disagreement or feeling uncomfortable.

In the illustrated embodiment, in particular, the target acceleration Gxat of the vehicle is computed such that its value Gxat increases as the vehicle speed V is higher. Therefore, the passenger of the vehicle can be prevented from feeling that the rate of increase of the vehicle speed is too large in a low-vehicle-speed region, and can be prevented from feeling that the rate of increase of the vehicle speed is too small in a high-vehicle-speed region.

Also, in the illustrated embodiment, the correction factor Kg is computed such that its value Kg becomes smaller as the slope gradient Gslope of the road is larger when the vehicle runs on a downhill as the slope. Therefore, the passenger of the vehicle can be prevented from feeling that the rate of increase of the vehicle speed is too small when the gradient of the downhill is small, and can be prevented from feeling that the rate of increase of the vehicle speed is too large when the gradient of the downhill is large.

Figure 8:
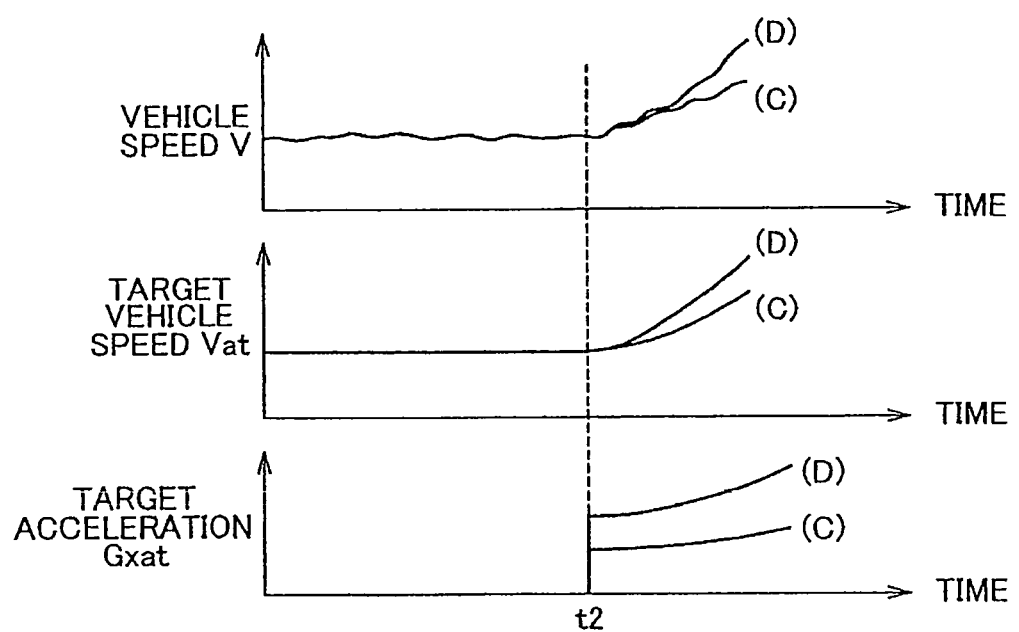
FIG. 8 is a graph illustrating vehicle speed limit control and speed increase control performed by the vehicle speed control system of this embodiment, with respect to the case (C) where the slope gradient Gslope of a downhill of a road is large, and the case (D) where the slope gradient Gslope of the downhill is small.

For example, as shown in FIG. 8, the rate of increase of the vehicle speed after the completion of the vehicle speed limit control is made smaller in the case (C) where the slope gradient Gslope of the downhill of the road, which is estimated at time t2 at which the vehicle speed limit control is finished, is large, as compared with the case (D) where the slope gradient Gslope of the downhill is small. Thus, the rate of increase of the vehicle speed is prevented from becoming too small when the slope gradient of the road is small, and is also prevented from becoming too large when the slope gradient is large, so that the passenger of the vehicle can be surely prevented from feeling a sense of disagreement or feeling uncomfortable.

In the illustrated embodiment, the rate of increase of the vehicle speed is computed so as to increase as the slope gradient Gslope of the road is larger when the vehicle runs on an uphill as the slope. Therefore, the passenger of the vehicle can be prevented from feeling that the rate of increase of the vehicle speed is too small when the slope (uphill) gradient Gslope of the road is large, and can also be prevented from feeling that the rate of increase of the vehicle speed is too large when the slope (uphill) gradient Gslope of the road is small.

While the particular embodiment of the invention has been described above in detail, it would be obvious to those skilled in the art that the invention is not limited to the above-described embodiment, but may be implemented in various other embodiments or forms within the scope of the invention.

In the above-described embodiment, the longitudinal acceleration Gx of the vehicle is subjected to the process using the low-pass filter so that a steady component of the longitudinal acceleration Gx is extracted, and the slope gradient Gslope of the road is estimated based on the steady component of the longitudinal acceleration Gx. However, the slope gradient Gslope of the road may be estimated in any manner known in the relevant art. For example, the gradient Gslope may be estimated based on the height of the vehicle.

In the above-described embodiment, the correction factor Kg is computed so as to increase within the range equal to or larger than 1 as the magnitude of the slope gradient Gslope is larger when the vehicle runs on an uphill. However, computation of the correction factor Kg may be omitted (i.e., may not be performed) when the vehicle runs on an uphill, but may be set to 1 in this case.

While the vehicle is a four-wheel drive vehicle including a transfer gearbox in the above-described embodiment, the vehicle speed control system according to the invention may be employed in any type of vehicle provided that the vehicle is able to perform vehicle speed limit control for controlling the vehicle speed to the upper-limit vehicle speed or lower, and perform speed increase control for controlling the rate of increase of the vehicle speed to the target rate of increase of the vehicle speed upon the completion of the vehicle speed limit control.

The invention claimed is:

1. A vehicle speed control system which is installed in a vehicle which has a vehicle speed detector, comprising:
    a controller that performs vehicle speed limit control that limits a vehicle speed so that the vehicle speed detected by the vehicle speed detector does not exceed a speed limit, and speed increase rate control that allows increase of the speed of the vehicle after the vehicle speed limit control is finished while limiting a rate of increase of the speed of the vehicle so that the rate of increase of the vehicle speed does not exceed a target rate of increase of the vehicle speed, wherein
    the controller sets the target rate of increase of the vehicle speed based on the vehicle speed detected by the vehicle speed detector, so that the target rate of increase of the vehicle speed after the vehicle speed limit control is finished is larger when the vehicle speed is high during the vehicle speed limit control compared to when the vehicle speed is low during the vehicle speed limit control.

2. The vehicle speed control system according to claim 1, wherein
    the vehicle speed limit control comprises a control that controls braking and driving force of the vehicle so that the vehicle speed becomes equal to or lower than the speed limit, irrespective of a gradient of a road surface, and the speed increase rate control comprises a control that controls braking and driving force of the vehicle so that the rate of increase of the speed of the vehicle becomes equal to the target rate of increase of the vehicle speed.

3. The vehicle speed control system according to claim 2, wherein
    the controller finishes the speed increase rate control in at least one of the case where the braking forces of all wheels become substantially equal to 0, and the case where an accelerating or decelerating operation is performed by a driver, in a situation where the speed increase rate control is performed.

4. The vehicle speed control system according to claim 1, wherein
    the vehicle speed limit control comprises a control that controls at least a braking force of the vehicle so that the vehicle speed does not exceed the speed limit when the vehicle runs on a downhill, and the speed increase rate control comprises a control that controls at least the braking force of the vehicle so that the rate of increase of the speed of the vehicle during downhill running of the vehicle does not exceed the target rate of increase of the vehicle speed.

5. The vehicle speed control system according to claim 4, wherein
    the vehicle speed limit control comprises control that controls at least the braking force of the vehicle so as to control the vehicle speed so that the vehicle speed becomes equal to or lower than the speed limit when the vehicle runs on a downhill, and the speed increase rate control comprises control that controls at least the braking force of the vehicle so that the rate of increase of the speed of the vehicle during downhill running becomes equal to the target rate of increase of the vehicle speed.

6. The vehicle speed control system according to claim 1, wherein
    the controller includes an obtaining unit that obtains a gradient of a road on which the vehicle runs, and sets the target rate of increase of the vehicle speed based on the vehicle speed and the gradient of the road when the vehicle speed limit control is finished.

7. The vehicle speed control system according to claim 6, wherein
    the controller sets the target rate of increase of the vehicle speed to a smaller value when the gradient of a downhill of the road is large, than that obtained when the gradient of the downhill of the road is small.

8. The vehicle speed control system according to claim 6, wherein
    the controller estimates the gradient of the road, based on a steady component of a longitudinal acceleration of the vehicle.

9. The vehicle speed control system according to claim 1, wherein
    the controller computes a target vehicle speed based on a target vehicle speed of the last cycle and the target rate of increase of the vehicle speed at predetermined computation intervals, and controls a braking and a driving force of the vehicle so that the vehicle speed becomes equal to the target vehicle speed.

10. The vehicle speed control system according to claim 1, wherein
    the controller system finishes the vehicle speed limit control in at least one of the case where an operation to finish the vehicle speed limit control is performed by a driver and the case where the vehicle speed control system does not operate normally, in a situation where the vehicle speed limit control is performed.

11. The vehicle speed control system according to claim 10, wherein
    the vehicle includes a vehicle speed limit switch adapted to be operated by the driver, and it is determined that the operation to finish the vehicle speed limit control is performed by the driver when the driver switches the vehicle speed limit switch to an OFF state.

12. The vehicle speed control system according to claim 1, wherein
    the vehicle includes a vehicle speed limit switch adapted to be operated by a driver, and the vehicle speed limit control is performed when the vehicle speed limit switch is in an ON state.

13. The vehicle speed control system according to claim 1, wherein
    the vehicle is a four-wheel drive vehicle including a vehicle speed limit switch adapted to be operated by a driver and a transfer gearbox, and the vehicle speed limit switch can be switched to an ON state through a driver's operation only when a shift position of the transfer gearbox is an L range.

14. A vehicle speed control method of a vehicle, comprising:
    detecting a vehicle speed with a vehicle speed detector;
    limiting the vehicle speed with a controller so that the vehicle speed does not exceed a speed limit; and after the vehicle speed limiting step is finished, allowing increase of the speed of the vehicle with the controller while limiting a rate of increase of the speed of the vehicle so that the rate of increase of the vehicle speed does not exceed a target rate of increase of the vehicle speed, wherein the target rate of increase of the vehicle speed is set based on the detected vehicle speed, such that the target rate of increase of the vehicle speed after the vehicle speed limiting step is finished is larger when the vehicle speed high during the vehicle speed limiting step compared to when the vehicle speed is low during the vehicle speed limiting step.

15. The vehicle speed control method according to claim 14, further comprising:

obtaining a gradient of a road on which the vehicle runs; and setting the target rate of increase of the vehicle speed based on the vehicle speed and the gradient of the road when the vehicle speed limiting step is finished.

16. The vehicle speed control method according to claim 15, wherein the target rate of increase of the vehicle speed is set to a smaller value when the gradient of a downhill of the road is large, than that obtained when the gradient of the downhill is small.

* * * * *